(12) United States Patent
Sachdeva et al.

(10) Patent No.: US 11,430,341 B2
(45) Date of Patent: Aug. 30, 2022

(54) SYSTEM AND METHOD FOR OPTIMIZING UNMANNED AERIAL VEHICLE BASED WAREHOUSE MANAGEMENT

(71) Applicant: Cognizant Technology Solutions India Pvt. Ltd., Chennai (IN)

(72) Inventors: Gurpreet Singh Sachdeva, Bangalore (IN); Ramesh Yechangunja, Bangalore (IN)

(73) Assignee: COGNIZANT TECHNOLOGY SOLUTIONS SINDIA PVT. LTD., Chennai (IN)

( * ) Notice: Subject to any disclaimer, the term of this patent is extended or adjusted under 35 U.S.C. 154(b) by 512 days.

(21) Appl. No.: 16/519,154

(22) Filed: Jul. 23, 2019

(65) Prior Publication Data

US 2020/0380876 A1    Dec. 3, 2020

(30) Foreign Application Priority Data

May 31, 2019    (IN) .............................. 201941021654

(51) Int. Cl.
*G06Q 10/08*    (2012.01)
*G06T 7/13*    (2017.01)
(Continued)

(52) U.S. Cl.
CPC ......... *G08G 5/0034* (2013.01); *B64C 39/024* (2013.01); *G06Q 10/087* (2013.01); *G06T 7/13* (2017.01); *G06T 17/05* (2013.01); *G08G 5/0069* (2013.01); *B64C 2201/12* (2013.01); *B64C 2201/141* (2013.01); *G06T 2207/30241* (2013.01); *G06T 2207/30261* (2013.01)

(58) Field of Classification Search
CPC ...... G08G 5/0034; G08G 5/0069; G06T 7/13; G06T 17/05; G06T 2207/30241; G06T 2207/30261; B64C 39/024; B64C 2201/12; B64C 2201/141; G06Q 10/087
See application file for complete search history.

(56) References Cited

U.S. PATENT DOCUMENTS 8,964,036 B2    2/2015    Golan
9,024,755 B2    5/2015    Furh
(Continued)

OTHER PUBLICATIONS http://www.dronescan.co/info, Stock Take, Physical Inventory, Cycle Counting, DroneScan, 2019.
(Continued)

*Primary Examiner* — Ig T An
(74) *Attorney, Agent, or Firm* — Cantor Colburn LLP

(57) ABSTRACT

The present invention discloses a system and a method for optimizing Unmanned Aerial Vehicle (UAV) based warehouse management, where an optimized path for UAV is generated in real time based on the density of inventory. In operation, the present invention provides for identifying landmark features of the warehouse and density of inventory. Further, a 3D grid map an aisle of the warehouse is generated using the density of inventory. Finally, a navigation path for the UAV for a mission is generated based on the generated 3D grid map using one or more path planning techniques. Further, the present invention provides for updating the navigation path if one or more changes are observed in the density of the inventory.

27 Claims, 6 Drawing Sheets

(51) Int. Cl.
    *B64C 39/02*     (2006.01)
    *G06T 17/05*     (2011.01)
    *G08G 5/00*     (2006.01)

(56) References Cited

U.S. PATENT DOCUMENTS

| | | | |
|---|---|---|---|
| 9,473,747 | B2 | 10/2016 | Kobres |
| 9,697,429 | B2 | 7/2017 | Patel |
| 2016/0378117 | A1* | 12/2016 | Szatmary ............... G01S 17/89 382/153 |
| 2017/0320572 | A1* | 11/2017 | High ...................... B64D 1/02 |
| 2019/0302791 | A1* | 10/2019 | Nageswaran ........ G05D 1/0088 |
| 2019/0346271 | A1* | 11/2019 | Zhang .................... G01C 21/20 |
| 2020/0142410 | A1* | 5/2020 | Liu ......................... G01C 21/00 |

OTHER PUBLICATIONS http://www.mwpvl.com/html/warehouse_heat_map.html, The Warehouse Heat Map—A New Tool to Analyze Warehouse Productivity, MWPVL International Inc., Jul. 10, 2019.

https://intellitrack.com/resources/blog/how-to-set-up-bin-and-rack-locations-for-successful-warehouse-management/, How to Set Up Bin and Rack Locations for Successful Warehouse Management, Kushal Banerjee, Sep. 20, 2016.

https://www.ais.uni-bonn.de/papers/ROS_Book_Beul_2017.pdf, Autonomous Navigation in a Warehouse With a Cognitive Micro Aerial Vehicle, Marius Beul et al., Robot Operating System (ROS), The Complete Reference (vol. 2), Springer 2017.

https://www.dronezon.com/learn-about-drones-quadcopters/best-uses-for-time-of-flight-tof-camera-depth-sensor-technology-in-drones-or-ground-based/,Flash Lidar Time of Flight (ToF) Camera Sensors on Drones and 10 Terrific Uses, Fintan Corrigan, Jun. 26, 2019.

https://www.thefuturewarehouse.com/drones/, Drone Stock Counting, Argon Consulting, 2019.

Markus Kuckelhaus, "A Smarter Way to Handle and Move Materials", Aug. 22, 2018, URL: https://www.mhlnews.com/technology-automation/article/22055187/a-smarter-way-to-handle-and-move-materials.

Venkat Garlapati, "Autonomous UAV Navigation in an Indoor Environment for Warehouse Inventory Recording", Jan. 19, 2016.

\* cited by examiner

# SYSTEM AND METHOD FOR OPTIMIZING UNMANNED AERIAL VEHICLE BASED WAREHOUSE MANAGEMENT

CROSS REFERENCE TO RELATED APPLICATION

This application is related to and claims the benefit of Indian Patent Application Number 201941021654 dated May 31, 2019, the contents of which are herein incorporated by reference in their entirety.

FIELD OF THE INVENTION

The present invention relates generally to warehouse management and more particularly to a system and a method for optimizing unmanned aerial vehicle (UAV) based warehouse management.

BACKGROUND OF THE INVENTION

Unmanned Aerial Vehicles (UAVs) such as autonomous drones are being implemented to solve industrial problems where physical reach or inspection is challenging. One such implementation of UAVs is in warehouse management. In particular, UAVs are operated inside a GPS denied warehouse environment and navigate along aisles of warehouse to collect data associated with inventory placed on multiple shelves in each aisle. The UAVs are generally integrated with payload scanners to scan barcodes, QR codes, RFID etc. of the inventories on each shelf. The scanned data is transmitted to warehouse management systems for inventory record generation, record validation etc. The UAVs follow a path generated using a pre-existing map covering the entire area of the warehouse. However, in the process of following the predefined path the UAVs also scan areas of the warehouse where no inventory is placed, resulting in excessive time and battery consumption by the UAVs to complete a mission pertaining to collection of data associated with inventory at either a single shelf, multiple shelves or all the shelves etc. in one or more aisles of the warehouse. Further, the generated UAV path is not designed to detect dynamic placement of inventory. In particular, if new inventory is placed on one or more shelves during an ongoing mission to collect data associated with inventory at all the shelves in one or more aisles of the warehouse, the UAV leaves out scanning of the new inventory.

In light of the above drawbacks, there is a need for a system and method for optimizing UAV based warehouse management. There is a need for a system and a method which provides optimized path for UAVs based on density of inventory in the warehouse in real time. There is a need for a system and a method which reduces the amount of time spent by the UAV in a mission pertaining to collection of data associated with inventory in the warehouse. Further, there is a need for a system and a method which tracks dynamic placement of new inventories in the designed path in real time. Furthermore, there is a need for a system and a method which minimizes UAVs battery consumption. Yet further, there is a need for a system for optimizing path for UAVs which can be integrated with existing warehouse management systems.

SUMMARY OF THE INVENTION

In various embodiments of the present invention, a method for generating optimized path for an Unmanned Aerial Vehicle (UAV) for warehouse management is provided. The method is implemented by at least one processor executing program instructions stored in a memory. The method comprises identifying landmark features of an aisle of a warehouse and density of inventory. The density of inventory is representative of number of items on shelves in the aisle. The method further comprises generating a three dimensional (3D) grid map for the aisle using a pre-existing map of the warehouse, the identified landmark features and the identified density of inventory. The 3D grid map includes one or more navigation grids representing the plurality of shelves, the navigation grids are marked based on the identified density of inventory. Further, the method comprises generating a navigation path for the UAV based on the generated 3D grid map. The navigation path includes density nodes representing direction to the shelves of the aisle having the inventory, thereby optimizing warehouse management.

In various embodiments of the present invention, a system for generating optimized path for an Unmanned Aerial Vehicle (UAV) for warehouse management is provided. The system comprises a memory storing program instructions, a processor configured to execute program instructions stored in the memory, and a path planning engine in communication with the processor. The system is configured to identify landmark features of an aisle of a warehouse and density of inventory, where density of inventory is representative of number of items on shelves in the aisle. Further, the system is configured to generate a three dimensional (3D) grid map for the aisle using a pre-existing map of the warehouse, the identified landmark features and the identified density of inventory. The 3D grid map includes one or more navigation grids representing the plurality of shelves, the navigation grids are marked based on the identified density of inventory. Furthermore, the system is configured to generate a navigation path for the UAV based on the generated 3D grid map. The navigation path includes density nodes representing direction to the shelves of the aisle having the inventory, thereby optimizing warehouse management.

In various embodiments of the present invention, a computer program product is provided. The computer program product comprises a non-transitory computer-readable medium having computer-readable program code stored thereon, the computer-readable program code comprising instructions that, when executed by a processor, cause the processor to identify landmark features of an aisle of a warehouse and density of inventory. The density of inventory is representative of number of items on shelves in the aisle. Further, a three dimensional (3D) grid map for the aisle is generated using a pre-existing map of the warehouse, the identified landmark features and the identified density of inventory. The 3D grid map includes one or more navigation grids representing the plurality of shelves, the navigation grids are marked based on the identified density of inventory. Furthermore, a navigation path for the UAV is generated based on the generated 3D grid map, wherein the navigation path includes density nodes representing direction to the shelves of the aisle having the inventory, thereby optimizing warehouse management.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for optimizing Unmanned Aerial Vehicle (UAV) based warehouse management. In particular, the system and method of the present invention generates an optimized path for the UAV based on density of inventory in the warehouse in real time. In operation, the present invention provides for generating a path for UAV based on the density of inventory using a set of rules. The set of rules include receiving a plurality of images of the warehouse via one or more image capturing devices associated with the UAV. The set of rules further include identifying landmark features of the warehouse and density of inventory by performing image segmentation and analytics on the captured plurality of images using one or more deep learning techniques. Further, the set of rules include generating a 3D grid map of the aisles of the warehouse using the segmented images. Finally, the set of rules include generating a path for the UAV for a mission based on the generated 3D grid map using one or more path planning techniques. The mission may include, but is not limited to, collection of data associated with inventory at either a single shelf, multiple shelves or all the shelves etc. in one or both racks forming respective aisles of the warehouse to enable the warehouse management system 102 to verify, update and maintain inventory record. The present invention further provides for operating the UAV to follow the generated path trajectory, tracking UAV position and identifying new inventories in the generated path until the UAV completes the mission. Further, the present invention provides for updating the path if one or more changes are observed in the density of the inventory.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The term inventory as used in the specification refers to items including, but not limited to, raw materials, unfinished goods, finished merchandise etc.

The present invention would now be discussed in context of embodiments as illustrated in the accompanying drawings.

Figure 1:
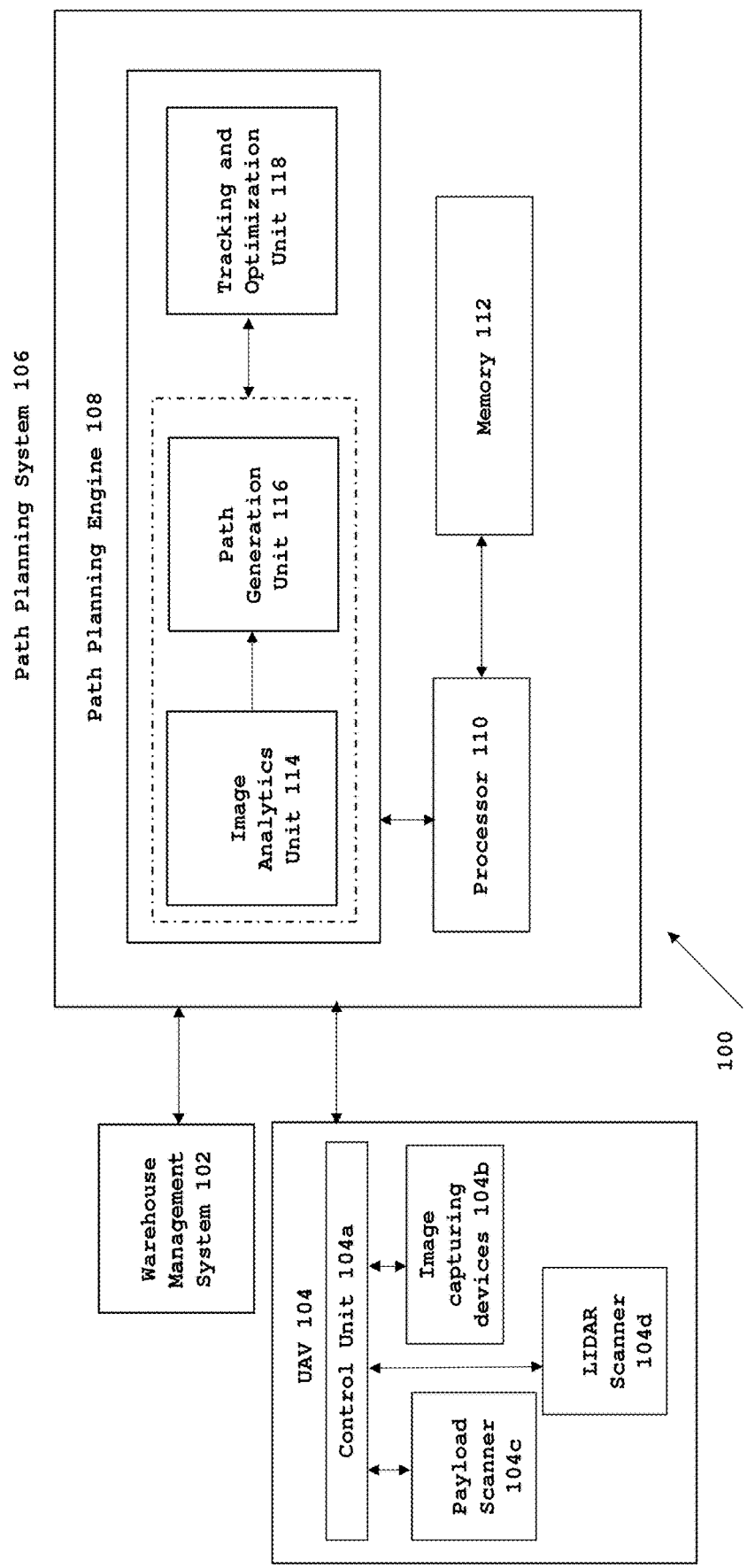
FIG. 1 illustrates a detailed block diagram of a system for generating optimized path for Unmanned Aerial Vehicle (UAV) for warehouse management, in accordance with an embodiment of the present invention.

FIG. 1 illustrates a detailed block diagram of a system for generating optimized path for Unmanned Aerial Vehicle (UAV) for warehouse management, in accordance with an embodiment of the present invention. Referring to FIG. 1, in an embodiment of the present invention, an environment 100 for a system for optimizing Unmanned Aerial Vehicle (UAV) based warehouse management is illustrated. In various embodiments of the present invention, the environment 100 comprises a warehouse management system 102, an Unmanned Aerial Vehicle (UAV) and a system for generating optimized path for UAV for warehouse management, hereinafter referred to as path planning system 106.

In an embodiment of the present invention, the warehouse management system 102 may be a software, hardware or a combination of software and hardware. The warehouse management system 102 is configured to facilitate management tasks of the warehouse. The management tasks of a warehouse may include, but are not limited to, daily planning; organizing; staffing; directing; controlling utilization of available resources, to move and store inventory into, within, and out of the warehouse, maintaining one or more records of the inventory and validating the records. In an embodiment of the present invention, the warehouse management system 102 includes an input/output (I/O) terminal device (not shown) to receive one or more inputs from a user to perform warehouse management. In various exemplary embodiments of the present invention, the input/output (I/O) terminal device (not shown) may include, but is not limited to, a touchscreen display, microcomputer or any other wired or wireless device capable of receiving inputs and displaying output results. In an embodiment of the present invention as shown in FIG. 1, the warehouse management system 102 is configured to interface with the path planning system 106.

In various embodiments of the present invention, the UAV 104 is any aircraft capable of flying without a human pilot aboard and can be operated remotely. In an exemplary embodiment of the present invention, the UAV is a drone having autonomous navigation capabilities. In an embodiment of the present invention, the UAV 104 includes a control unit 104a, one or more image capturing devices 104b, payload scanners 104c, LIDAR scanners 104d and one or more Inertial Measurement Units (IMUs) not shown. Examples of image capturing devices 104b may include, but are not limited to, cameras, optical lenses and the like. The control unit 104a interfaces with the one or more image capturing devices 104b, payload scanners 104c, LIDAR scanners 104d and the one or more IMUs. The control unit 104a is configured to control the flight of the UAV and various functions of the components 104b, 104c and 104d. In an embodiment of the present invention as shown in FIG. 1, the control unit 104a interfaces with the path planning system 106 to optimize flight and control multiple functions of the UAV 104.

In various embodiments of the present invention, the path planning system 106 may be a hardware, software or a combination of hardware and software. In an embodiment of the present invention as shown in FIG. 1, the path planning system 106 interfaces with the warehouse management system 102 and the UAV 104 over a communication channel (not shown). Examples of the communication channel may include, but are not limited to, an interface such as a software interface, a physical transmission medium, such as, a wire, or a logical connection over a multiplexed medium, such as, a radio channel in telecommunications and computer networking. Examples of radio channel in telecommunications and computer networking may include, but are not limited to, RFID, Bluetooth, a Local Area Network (LAN), a Metropolitan Area Network (MAN), and a Wide Area Network (WAN). In another embodiment of the present invention, the path planning system 106 may be a part of the control unit 104a of the UAV 104 and may interface with the warehouse management system 102 over a communication channel (not shown). In yet another embodiment of the present invention, the path planning system 106 may be an integral part of the warehouse management system 102 and may interface with the UAV 104 over a communication channel (not shown). Examples of the communication channel may include, but are not limited to, a physical transmission medium, such as, a wire, or a logical connection over a multiplexed medium, such as, a radio frequency channel in telecommunications and computer networking. Examples of radio channel in telecommunications and computer networking may include, but are not limited to, RFID, Bluetooth, a Local Area Network (LAN), a Metropolitan Area Network (MAN), and a Wide Area Network (WAN). In yet another embodiment of the present invention, the path planning system 106, the warehouse management system 102 and the control unit 104a of the UAV may be boxed as a single unit to remotely control the UAV and optimize warehouse management In another embodiment of the present invention, the path planning system 106 may be implemented as a client-server architecture, wherein the UAV 104 and the warehouse management system 102 accesses a server hosting the path planning system 106 over a communication channel (not shown).

In another embodiment of the present invention, the planning system 106 may be implemented in a cloud computing architecture in which data, applications, services, and other resources are stored and delivered through shared data-centers. In an exemplary embodiment of the present invention, the functionalities of the path planning system 106 are delivered as software as a service (SAAS).

The path planning system 106 comprises a path planning engine 108, a processor 110 and a memory 112. The path planning engine 108 is operated via the processor 110 specifically programmed to execute instructions stored in the memory 112 for executing functionalities of the system 106 in accordance with various embodiments of the present invention. In various embodiments of the present invention, the path planning engine 108 is configured to generate an optimized path for the UAV 104 based on density of inventory in the warehouse. In particular, the path planning engine 108 is configured to analyze and segment images, identify features of warehouse and density of inventory, generate optimized paths, operate and track the UAV, identify placement of new inventory and update the path.

In various embodiments of the present invention, the path planning engine 108 has multiple units which work in conjunction with each other for generating an optimized path for Unmanned Aerial Vehicle (UAV) for warehouse management. The various units of the path planning engine 108 are operated via the processor 110 specifically programmed to execute instructions stored in the memory 112 for executing respective functionalities of the multiple units in accordance with various embodiments of the present invention.

In an embodiment of the present invention, the path planning engine 108 comprises an image analytics unit 114, a path generation unit 116, and a tracking and optimization unit 118.

In an embodiment of the present invention, the image analytics unit 114 along with the path generation unit 116 is configured to generate a path for UAV 104 based on a density of inventory in the warehouse. In an exemplary embodiment of the present invention, density of inventory is representative of number of items on each shelf in an aisle of the warehouse at a given time. The image analytics unit 114 and the path generation unit 116 generates the path for UAV 104 using the set of rules as described below.

In operation in an embodiment of the present invention, the image analytics unit 114 receives a mission request from the warehouse management system 102. The mission may include, but is not limited to, collection of data associated with inventory at either a single shelf, multiple shelves or all the shelves etc. in one or both racks forming respective aisles of the warehouse. Subsequent to receiving the mission request the image analytics unit 114 operates the UAV 104 to take off from an initial location to a desired image capturing location and position in the warehouse for capturing the one or more images along one or more aisles in the warehouse. The desired image capturing location of the UAV 104 is selected based on the type of mission and placement of racks forming respective aisles. The desired image capturing position is selected based on analysis of depth and height of the aisles of the warehouse. In an exemplary embodiment of the present invention, the desired location is entrance of respective one or more aisles included in the mission. In the exemplary embodiment of the present invention, the desired image capturing position is at a predefined height at the center of the aisle included in the mission. The image analytics unit 114 is configured to receive a plurality of images of the one or more aisles included in the mission via one or more image capturing devices 104b associated with the UAV 104. In an embodiment of the present invention, the images associated with the one or more aisles include landmark features of respective aisle. In an exemplary embodiment of the present invention, the landmark feature of an aisle may include, but are not limited to, edges, corners of the aisles, length, height and width of rack pair forming the aisle, distance between opposing rack pair forming the aisle, height of shelves, number of shelves, number of rack columns, pallets and any other storage unit on the racks or obstacle. The image analytics unit 114, is configured to combine the plurality of images associated with each of the one or more aisles respectively to analyze if the appropriate areas of the respective aisles are covered based on the type of mission. The image analytics unit 114 is configured to receive more images of the respective aisles included in the mission from the one or more image capturing devices 104b after the initial path is generated during the ongoing mission if the appropriate areas of the aisles are not covered.

Further, the image analytics unit 114 is configured to identify landmark features of each of the one or more aisles included in the mission and density of inventory associated with respective aisles by performing image segmentation and analytics on the captured images. As explained above the landmark feature of an aisle may include, but are not limited to, edges, corners of the aisles, length, height and width of rack pair forming the aisle, distance between opposing rack pair forming the aisle, height of shelves, number of shelves, number of rack columns, pallets and any other storage unit on the racks or obstacle. In an exemplary embodiment of the present invention, density of inventory is representative of number of items on each shelf in an aisle at a given time. The image analytics unit 114 uses one or more techniques to identify landmark feature of the aisles and density of inventory at each shelf of the racks forming the aisle. In an embodiment of the present invention, the one or more techniques may include but are not limited to, deep learning techniques, edge detection based segmentation technique, multi-class image segmentation, object detection techniques such as R-CNN etc. In an exemplary embodiment of the present invention, a deep learning model may be trained using an image data of the warehouse prepared using images of the entire warehouse and the associated aisles captured by the UAV 104 or any other image capturing device in the past. The image analytics unit 114 semantically classifies each of a plurality of pixels of respective images and analyses the segmented portions to identify the presence of inventory at one or more shelves in respective aisles included in the mission.

Figure 2:
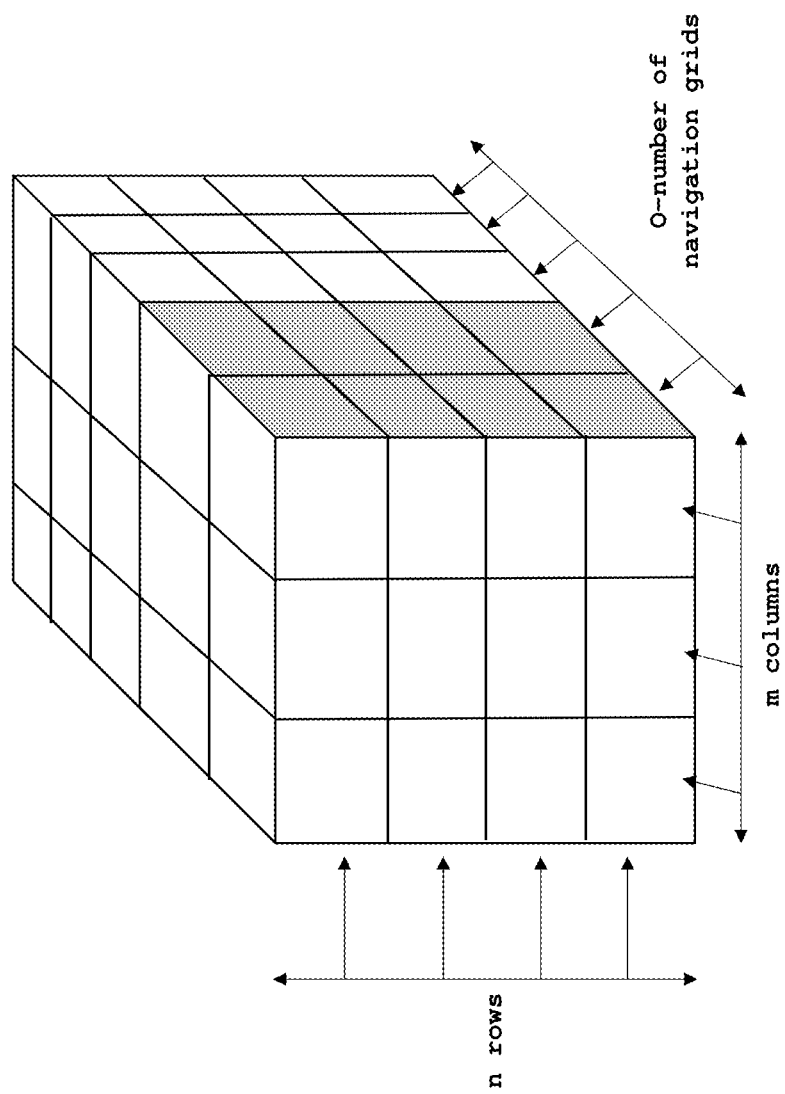
FIG. 2 is an exemplary 3D grid map associated with a length of an aisle, in accordance with an embodiment of the present invention.

In an embodiment of the present invention, the path generation unit 116 is configured to receive the segmented images and the identified density of inventory from the image analytics unit 114. The path generation unit 116 is configured to generate a three dimensional (3D) grid map for respective one or more aisles included in the mission using the segmented images, a pre-existing map of the warehouse, identified landmark features and identified density of inventory. In particular, the path generation unit 116 maps the identified density of inventory to landmark features of the corresponding aisles. For instance, the path generation unit 116 maps identified inventory with corresponding shelves, racks, and aisles of the warehouse. The path generation unit 116 is configured to generate a 3D grid map for respective one or more aisles included in the mission. The 3D grid map covers all the navigation possibilities of the UAV 104 based on the density mapping of inventory. The generation of the 3D grid map comprises generation of one or more density based navigation grids (DBNG) hereinafter also referred to as navigation grids. As shown in FIG. 2, the 3D grid map is in the form of (n×m×o) three dimensional (3-D) array of navigation grids, where n represents the number of rows in the navigation grid, m represents the number of columns in the navigation grid and o represents the number of navigation grids. Each of the one or more navigation grids are three dimensional and together cover at least a portion of length of the aisle. The number of navigation grids (o) associated with a length of the aisle are evaluated based on the smallest sized inventory along said length of the aisle at a given time. In particular, the number of navigation grids associated with the 3D grid map of an aisle is evaluated based on the number of shortest width inventories that can be linearly placed in the adjacent shelves along the length of any of the racks forming the aisle. The shortest width inventory may be determined using image segmentation via image analytics unit 114. In another embodiment of the present invention, the shortest width inventory may be predefined based on the analysis of dimensions of various inventories in the warehouse. In another embodiment of the present invention, the number of navigation grids are evaluated based on number of columns along the length of rack pair forming the aisle.

Figure 3:
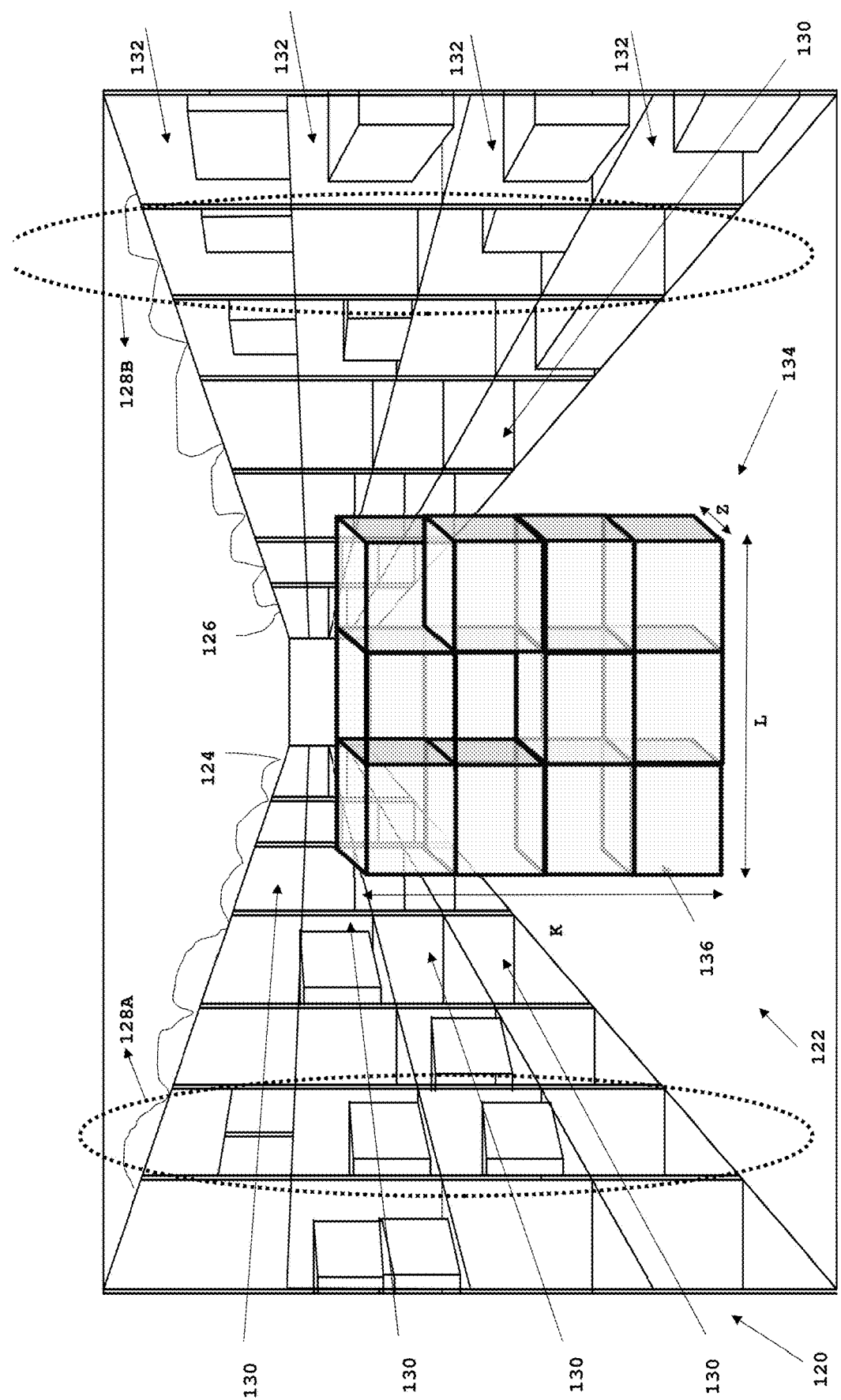
FIG. 3 is an exemplary navigation grid associated with linearly opposing columns of rack pairs forming an aisle of the warehouse, in accordance with an embodiment of the present invention.
Figure 4:
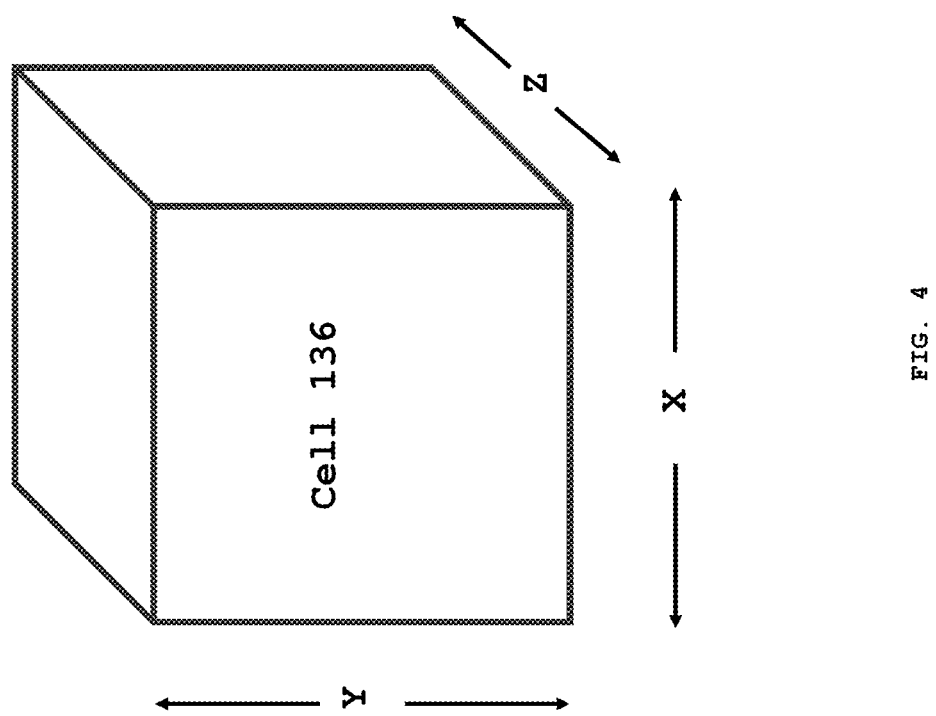
FIG. 4 illustrates a cell of the navigation grid of FIG. 3, in accordance with an embodiment of the present invention.

In various embodiments of the present invention, each navigation grid is in the form of n×m matrix, where n represents the number of rows in the navigation grid and m represents the number of columns in the navigation grid. Further, n and m are real numbers. The rows and columns divide each navigation grid into n×m three dimensional (3D) cells. The navigation grid is explained in detail with reference to FIG. 3 and FIG. 4. As shown in FIG. 3 the warehouse 120 comprises an aisle 122 formed by the rack pair 124 and 126. The racks 124 and racks 126 are positioned to face each other. In an exemplary embodiment of the present invention, the rack 124 is a mirror of rack 126. Each of the racks 124 and 126 are vertically partitioned into a plurality of columns hereinafter referred to as rack columns 128A and rack columns 128B. Each of the racks 124 and 126 are horizontally partitioned into one or more rows herein after referred to as rack rows 130. The horizontal partitioning of the racks divides the rack columns 128A and 128B into multiple shelves (132). In an exemplary embodiment of the present invention, the shelves 132 may have equal dimensions. In another embodiment of the present invention, the shelves 132 may have varying dimensions.

Each navigation grid 134 is three dimensional (3D) and has dimensions L, K and Z, where L, K and Z are real numbers and represent length, height and depth, respectively, of the navigation grid 134. Further, L, K and Z may be measured in centimeters (cm), meters, inches, feet or any other unit for measurement of length, height or distance. Each navigation grid 134 represents a navigation path associated with at least a portion of longitudinally arranged shelves 132 of linearly opposing rack columns 128A and 128B forming the aisle. In an exemplary embodiment of the present invention, the portion of longitudinally arranged shelves is representative of width of shelf 132 covered by the shortest width inventory. The term "width of the inventory" refers to the width of the face of inventory placed along the width of the shelf 132. As already explained above, the shortest width inventory may be determined using image segmentation via image analytics unit 114. In another embodiment of the present invention, the shortest width inventory may be predefined based on the analysis of dimensions of various inventories in the warehouse.

The height K of the navigation grid 134 is representative of height of any of the racks 124 and 126. The height K of the navigation grid 134 is also the combined height of all the rows (n). In an embodiment of the present invention where the rack 124 and rack 126 are mirror of each other, the number of rows (n) of the navigation grid 134 is computed based on the number of shelves 132 in a rack column 128A or 128B, such that the combined height (K) of all the rows is substantially equal to the height of any of the rack 124 or 126 forming the aisle 122. In an exemplary embodiment of the present invention, as shown in FIG. 3, the number of shelves are 4, thereby the number of rows of the navigation grid 134 are 4. In an embodiment of the present invention, the number of shelves may be derived from segmented images of the aisle or from the warehouse map. In various embodiment of the present invention, the warehouse map includes the warehouse layout design plan. In another embodiment of the present invention, the number of rows (n) of the navigation grid 134 are evaluated based on the shortest sized inventory in the aisle at a given time. In particular, the number of rows (n) of each of the navigation grid 134 of an aisle is evaluated based on the number of shortest height inventories that can be stacked vertically along the height of any of the racks 124 or 126 forming the aisle. The shortest height inventory may be determined using image segmentation via image analytics unit 114. In another embodiment of the present invention, the shortest height inventory may be predefined based on the analysis of dimensions of various inventories in the warehouse. The term "height of the inventory" refers to the height of the face of inventory placed vertically along the height of the shelf 132.

The length L of the navigation grid 134 is the combined width of columns of the grid 134. Further, the length L of the navigation grid 134 is representative of distance between the rack pair 124 and 126. In an embodiment of the present invention, the number of columns (m) of the navigation grid 134 are computed based on a distance between the rack pair 124 and 126 and the image capturing range of the one or more image capturing devices 104b associated with the UAV 104, such that the combined width of the columns which is (L) is equivalent to a proportion of the distance between the rack pair 124 and 126. In an exemplary embodiment of the present invention, the image capturing devices 104b have an image capturing range of 1 feet and the distance between the rack pair 124 and 126 is 3 feet. The number of columns of the navigation grid 134 associated with linearly opposing rack columns 128A and 128B may be selected as 3.

In an embodiment of the present invention, each cell 136 of the navigation grid 134 is a three dimensional (3D) cuboid having dimensions (X×Y×Z), where X, Y and Z are real numbers. X is representative of column width of the navigation grid 134. As explained above, the combined width of the columns of navigation grid is equivalent to a proportion of the distance between the rack pair 124 and 126, whereby column width is dependent on the number of columns. In an exemplary embodiment of the present invention, where the number of columns are 3 and the distance between the rack pairs is 124 and 126 is 3 feet, the width X associated with the column is 1 feet. In particular, the width of cell 136 is 1 feet. Y is representative of height of a row of the navigation grid 134. As explained above, the number of rows of the navigation grid are computed based on the number of shelves 132 in any rack column 128A or 128B, such that the combined height of rows is substantially equal to the height of any of the racks 124 and 126 forming the aisle 122. Thereby, height Y associated with the row is derived by dividing height of the rack 124 or 126 by number of shelves 132. In another embodiment of the present invention, the height Y associated with the rows of the navigation grid 134 is evaluated based on the shortest height inventory in the aisle. Further, Z is representative of the depth of the rows or the columns of the navigation grid 134, in particular Z represents the depth of the navigation grid 134. As explained above, the number of navigation grids are evaluated based on number of any of the rack columns 128A or 128B along the length of rack pair 124 and 126, whereby Z is the width of rack column 128. In another embodiment of the present invention, where the number of navigation grids are evaluated based on the number of shortest width inventories that can be linearly placed in the adjacent shelves 132 along the length of racks 124 or 126, Z is the width of the smallest inventory in the shelf 132. In another embodiment of the present invention, the path associated with individual cells 136 of the navigation grid 134 for the lateral, longitudinal forward and backward movement of UAV 104 can be enhanced based on the shortest dimensions of the inventory.

Each cell 136 of the navigation grid is associated with at least a portion of shelf 132 in one or both the linearly opposing rack columns 128A and 128B. The association of cells 136 with the shelves 132 is based on the longitudinal order of the shelves in the linearly opposing rack columns 128A and 128B. In an exemplary embodiment of the present invention, as shown in FIG. 3, the left top cell 136 of the grid 134 is associated with left top shelf 132. The right top cell 136 is associated with right top shelf 132 and the middle top cell is associated with both the top left and top right shelves 132. Further the middle left cell 136 is associated with middle left shelf 132. Similarly, all cells 136 are associated with a shelf based on the longitudinal order of the shelves in the linearly opposing rack columns 128A and 128B.

The path generation unit 116 is further configured to generate a 3D grid map corresponding to an aisle included in the mission using the navigation grids 134 corresponding to the aisle. The 3D grid map is generated to cover a portion of length of the aisle and enables the UAV 104 to cover the entire width between the rack pair 124 and 126 forming the aisle 122. The path generation unit 116 processes each navigation grid 134 using the density mapping of the inventory and arranges the navigation grids in an order of rack columns along the aisle to generate a 3D grid map covering at least a portion of length of the aisle. In an embodiment of the present invention, the individual cells 136 of each navigation grid 134 are marked based on the density mapping of inventory with corresponding shelves 132 in laterally opposing racks columns 128A and 128B. In an exemplary embodiment of the present invention as shown in FIG. 3, the cells 136 corresponding to shelves 132 of rack column 128A and column 128B including inventory are marked by characters L, B and R. The cells 136 corresponding to shelves 132 of the rack column 128A and column 128B not including the inventory are marked by character N. The characters L, B, R and N define the movement of the UAV 104 for scanning the shelves 132. The character L is representative of unidirectional scanning of left shelf as per shelf orientation and the navigation grid 134. The character B is representative of bidirectional shelf scanning as per the row of the navigation grid 134. The path generation unit 116 marks the cells 136 of the navigation grid 134 as bi-directional scan (B) cell if both the laterally adjacent cells (L and R) have inventory. In particular, the character B is used for the middle cells of the row of the navigation grid 134 where left cell is marked with L and right cell is marked with R. The character R is representative of unidirectional right shelf scanning as per shelf orientation and the row of the navigation grid 134. The character N refers to no scanning as per the row of the navigation grid 134.

A representation of the Density Based Navigation Grid (DBNG) associated with a portion of longitudinally arranged shelves 132 of linearly opposing second rack columns 128A and 128B is shown.

$$\begin{bmatrix} L, & B, & R \\ L, & N, & N \\ L, & B, & R \\ N, & N, & N \end{bmatrix}$$

The characters L, R, B and N are representative of the marking on each cell 136 of the navigation grid 134 shown in FIG. 3.

The path generation unit 116 is configured to generate a navigation path for the UAV 104 for the respective aisles included in the received mission request based on the corresponding 3D grid map. The navigation path includes directions to the shelves 132 of the aisle having inventory. In particular, the path generation unit 116 generates a path for the UAV 104 for each aisle based on the generated 3D grid map using one or more path planning techniques. The path generation unit 116 processes the 3D grid map associated with the aisle into a unidirectional density nodes graph, where the individual cells 136 or a cluster of neighboring cells of the 3D grid map are representative of nodes of the graph. Each cell 136 of the each of the navigation grid 134 marked with no scan are discarded. Further, center of each of the remaining cells of each navigation grid 134 are represented as a node of the graph. Furthermore, all the nodes of each navigation grid 134 in the 3D grid map are connected to the other neighboring nodes in the same navigation grid and the subsequent navigation grids with an undirected edge. Finally, the nodes associated with cells marked as bidirectional scan are additionally marked with cyclic edge pointing to itself which is later converted to yaw of the UAV 104 in path planning.

The path planning unit 116 further uses one or more path planning techniques to generate a navigation path covering at least a portion of length of the aisle included in the mission from the density nodes graph. In an exemplary embodiment of the present invention, the path planning technique is an A-star path planning technique. The A-star path planning technique generates an optimized path for the UAV for the requested mission based on the generated density nodes graph. The resulting path includes directions to shelves 132 of the aisles comprising inventory and omits areas having no or sparse inventory. Advantageously, the resultant path improves efficiency of the UAV and optimizes warehouse management. The generated navigation path associated with the aisle is stored for future use. In an embodiment of the present invention, the path planning unit 116 is configured to use the stored navigation map if no change is detected in inventory density of aisles (included in the mission) after image segmentation. In an embodiment of the present invention, the path planning unit 116 is configured to update the stored path if a change is detected in inventory density of aisles (included in the mission) after image segmentation.

The tracking and optimization unit 118, is configured to receive the generated path and identified landmark features of respective aisles from the path generation unit 116. The tracking and optimization unit 118 is configured to operate the UAV 104 to follow the generated path trajectory. Further, the tracking and optimization unit 118 continuously tracks position of UAV 104 and performs a check to detect obstacles and new inventories in the generated path until the UAV 104 completes the mission. In an embodiment of the present invention, the tracking and optimization unit 118 uses the identified landmark features of the aisle along with LIDAR scanner 104*d* of the UAV 104 to detect dynamic obstacles and placement of new inventory in the generated path.

The tracking and optimization unit 118, uses one or more obstacle avoidance techniques to avoid the detected obstacles. Further, the tracking and optimization unit 118 transmits the information associated with the placement of new inventory to the path generation unit 116. The path generation unit 116 updates the generated path together with the image analytics unit 114 to include the shelves of the aisle where the new inventory is placed.

In various embodiments of the present invention, the system 106 of the present invention is configured to generate the navigation path associated with respective aisles included in the mission in real time. In an embodiment of the present invention, the system 106 is configured to operate the UAV to take off to one of the aisles included in the mission and generate a navigation path for length of the aisle covered by the image capturing devices 104*b* of the UAV. The system 106 is configured to capture the images of portion of the aisle not covered in the generated path after completion of the path trajectory associated with the portion of the aisle. The system 106 is configured to capture the images of the next aisle included in the mission after completion of the path trajectory associated with the portion of the aisle.

Figure 5:
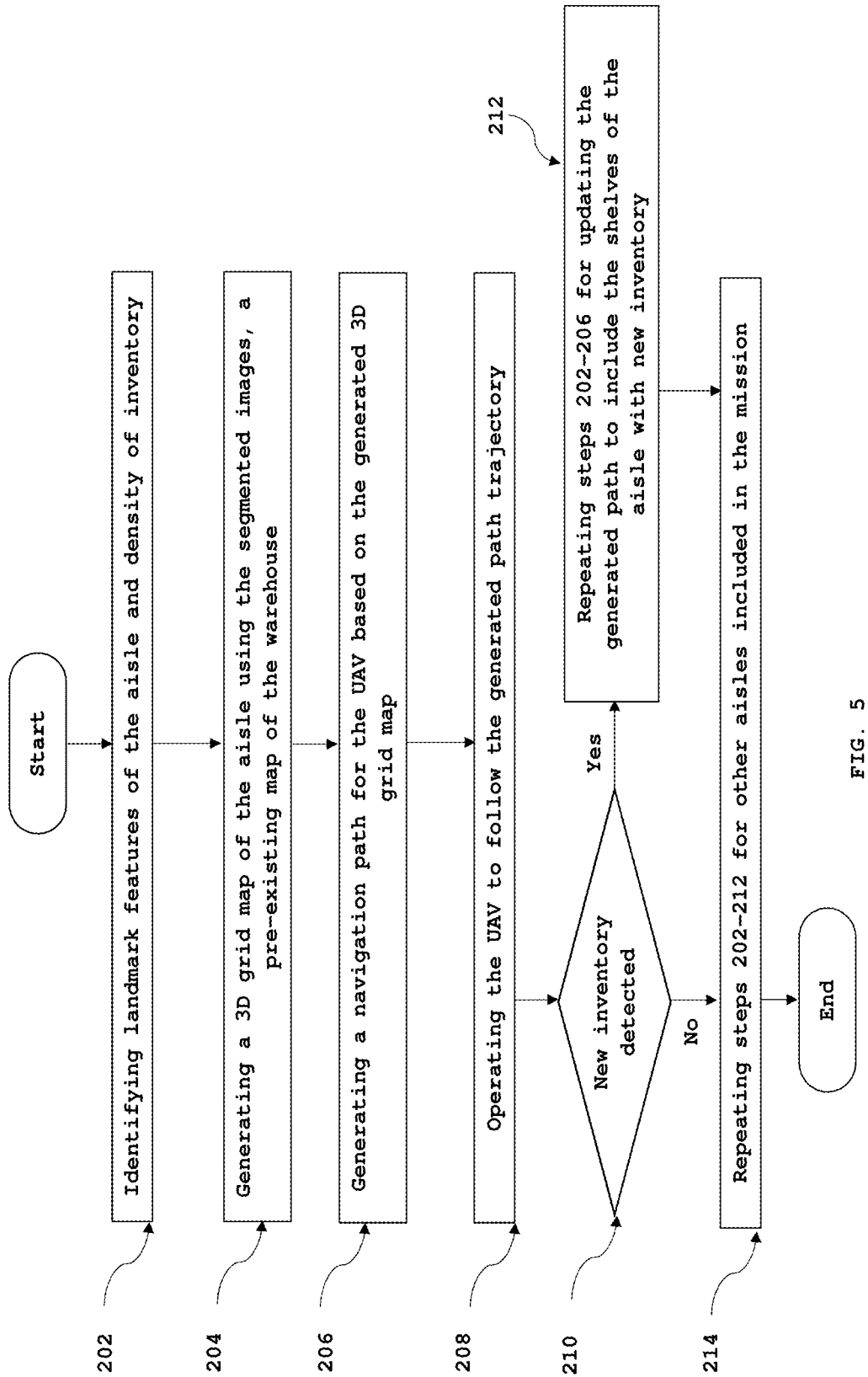
FIG. 5 is a flowchart illustrating a method for generating optimized navigation path for Unmanned Aerial Vehicle (UAV) for warehouse management, in accordance with an embodiment of the present invention.

FIG. 5 is a flowchart illustrating a method for generating optimized navigation path for Unmanned Aerial Vehicle (UAV) for warehouse management, in accordance with an embodiment of the present invention.

At step 202, landmark features of the aisle and density of inventory are identified. In an embodiment of the present invention, a UAV is operated to take off from an initial location to a desired location and position in the warehouse for capturing the one or more images along one or more aisles of warehouse (included in the mission) on receiving a mission request from a warehouse management system 102 of FIG. 1. In an exemplary embodiment of the present invention, the mission may include, but is not limited to, collection of data associated with inventory at either a single shelf, multiple shelves or all the shelves etc. in one or both racks forming respective aisles of the warehouse. The desired image capturing location of the UAV is selected based on the mission and placement of racks forming respective aisles. The desired position is selected based on analysis of depth and height of the aisles of the warehouse. In an exemplary embodiment of the present invention, the desired image capturing location is entrance of each of the one or more aisles included in the mission. In the exemplary embodiment of the present invention, the desired image capturing position is at a predefined height at the center of the aisle included in the mission.

A plurality of images of the aisles included in the mission are received via one or more image capturing devices 104*b* associated with the UAV. In an embodiment of the present invention, the images associated with the aisle include landmark features of respective aisle. In an exemplary embodiment of the present invention, the landmark feature of an aisle may include, but are not limited to, edges, corners of the aisles, length, height and width of racks forming the aisle, distance between rack pair forming the aisle, height of shelves, number of shelves, number of rack columns, pallets and any other storage unit on the racks or obstacle. The plurality of images associated with individual aisle are combined to analyze if the appropriate areas of the aisle are covered based on the type of mission. Additional, images of the respective aisles included in the mission are received from the one or more image capturing devices 104*b* after the initial path is generated during the ongoing mission if the appropriate areas of the aisles are not covered.

Further, the landmark features of each aisle included in the mission and density of inventory associated with respective aisles are identified by performing image segmentation and analytic on the captured images. As explained above the landmark feature of an aisle may include, but are not limited to, edges, corners of the aisles, length, height and width of racks forming the aisle, distance between rack pair forming the aisle, height of shelves, number of shelves, number of rack columns, pallets and any other storage unit on the racks or obstacle. In an exemplary embodiment of the present invention, density of inventory is representative of number of items on each shelf in an aisle at a given time. In an embodiment of the present invention, one or more techniques are used to identify landmark feature of the aisles and density of inventory at each shelf of the racks forming the aisle. In an embodiment of the present invention, the one or more techniques may include, but are not limited to, deep learning techniques, edge detection based segmentation technique, multi-class image segmentation, object detection techniques such as R-CNN etc. In an exemplary embodiment of the present invention, a deep learning model may be trained using an image data of the warehouse prepared using images of the entire warehouse and the associated aisles captured by the UAV or any other image capturing device in the past. Each of the plurality of pixels of respective images are semantically classified and the segmented portions are analyzed to determine the presence of inventory at one or more shelves in respective aisles included in the mission.

At step 204, a three dimensional (3D) grid map for respective one or more aisles included in the mission is generated using the segmented images, a pre-existing map of the warehouse, identified landmark features and identified density of inventory. In particular, the identified density of inventory is mapped to landmark features of the corresponding aisles. For instance, the identified inventory is mapped with corresponding shelves, racks, and aisles of the warehouse. A 3D grid map is generated for a length of respective one or more aisles included in the mission. The 3D grid map covers all the navigation possibilities of the UAV 104 based on the density mapping of inventory. The 3D grid map comprises one or more density based navigation grids (DBNG) hereinafter also referred to as navigation grids. In an embodiment of the present invention, the 3D grid map is in the form of (n×m×o) three dimensional (3-D) array of navigation grids, where n represents the number of rows in the navigation grid, m represents the number of columns in the navigation grid and o represents the number of navigation grids. Each of the one or more navigation grids are three dimensional and together cover at least a portion of length of the aisle. The number of navigation grids (o) associated with a length of the aisle are evaluated based on the smallest sized inventory along said length of the aisle at a given time. In particular, the number of navigation grids associated with the 3D grid map of an aisle is evaluated based on the number of shortest width inventories that can be linearly placed in the adjacent shelves along the length of any of the racks forming the aisle. The shortest width inventory may be determined using image segmentation via image analytics unit 114. In another embodiment of the present invention, the shortest width inventory may be predefined based on the analysis of dimensions of various inventories in the warehouse. In another embodiment of the present invention, the number of navigation grids are evaluated based on number of columns along the length of rack pair forming the aisle.

As already described above in para 48, in various embodiments of the present invention, each navigation grid is in the form of n×m matrix, where n represents the number of rows in the navigation grid and m represents the number of columns in the navigation grid. Further, n and m are real numbers. The rows and columns divide each navigation grid into n×m three dimensional (3D) cells. The navigation grid is explained in detail with reference to FIG. 3 and FIG. 4. As shown in FIG. 3 the warehouse 120 comprises an aisle 122 formed by the rack pair 124 and 126. The racks 124 and racks 126 are positioned to face each other. In an exemplary embodiment of the present invention, the rack 124 is a mirror of rack 126. Each of the racks 124 and 126 are vertically partitioned into a plurality of columns hereinafter referred to as rack columns 128A and rack columns 128B. Each of the racks 124 and 126 are horizontally partitioned into one or more rows herein after referred to as rack rows 130. The horizontal partitioning of the racks divides the rack columns 128A and 128B into multiple shelves (132). In an exemplary embodiment of the present invention, the shelves 132 may have equal dimensions. In another embodiment of the present invention, the shelves 132 may have varying dimensions.

Each navigation grid 134 is three dimensional (3D) and has dimensions L, K and Z, where L, K and Z are real numbers and represent length, height and depth, respectively, of the navigation grid 134. Further, L, K and Z may be measured in centimeters (cm), meters, inches, feet or any other unit for measurement of length, height or distance. Each navigation grid 134 represents a navigation path associated with at least a portion of longitudinally arranged shelves 132 of linearly opposing rack columns 128A and 128B forming the aisle. In an exemplary embodiment of the present invention, the portion of longitudinally arranged shelves is representative of width of shelf 132 covered by the smallest width inventory. The term "width of the inventory" refers to the width of the face of inventory placed along the width of the shelf 132. As already explained above, the shortest width inventory may be determined using image segmentation. In another embodiment of the present invention, the shortest width inventory may be predefined based on the analysis of dimensions of various inventories in the warehouse.

The height K of the navigation grid 134 is representative of height of any of the racks 124 and 126. The height K of the navigation grid 134 is also the combined height of all the rows (n). In an embodiment of the present invention, where the rack 124 and rack 126 are mirror of each other, the number of rows (n) of the navigation grid 134 is computed based on the number of shelves 132 in a rack column 128A or 128B, such that the combined height (K) of all the rows is substantially equal to the height of the rack pair 124 and 126 forming the aisle 122. In an exemplary embodiment of the present invention, as shown in FIG. 3, the number of shelves are 4, thereby the number of rows of the navigation grid 134 are 4. In an embodiment of the present invention, the number of shelves may be derived from segmented images of the aisle or from the warehouse map. In various embodiment of the present invention, the warehouse map includes the warehouse layout design plan. In another embodiment of the present invention, the number of rows (n) of the navigation grid 134 are evaluated based on the smallest sized inventory in the aisle at a given time. In particular, the number of rows (n) of each of the navigation grid 134 of an aisle is evaluated based on the number of shortest height inventories that can be stacked vertically along the height of any of the racks 124 or 126 forming the aisle. The shortest height inventory may be determined using image segmentation. In another embodiment of the present invention, the shortest height inventory may be predefined based on the analysis of dimensions of various inventories in the warehouse. The term "height of the inventory" refers to the height of the face of inventory placed vertically along the height of the shelf 132.

The length L of the navigation grid 134 is the combined width of columns of the grid 134. Further, the length L of the navigation grid 134 is representative of distance between the rack pair 124 and 126. In an embodiment of the present invention, the number of columns (m) of the navigation grid 134 are computed based on a distance between the rack pair 124 and 126 and the image capturing range of the one or more image capturing devices 104b associated with the UAV 104, such that the combined width of the columns which is (L) is equivalent to a proportion of the distance between the rack pair 124 and 126. In an exemplary embodiment of the present invention, the image capturing devices 104b have an image capturing range of 1 feet and the distance between the rack pair 124 and 126 is 3 feet. The number of columns of the navigation grid 134 associated with linearly opposing rack columns 128A and 128B may be selected as 3.

In an embodiment of the present invention, each cell 136 (FIG. 3) of the (n×m) navigation grid 134 is a three dimensional (3D) cuboid having dimensions (X×Y×Z), where X, Y and Z are real numbers. X is representative of column width of the navigation grid 134. As explained above, the combined width of the columns of navigation grid is equivalent to a proportion of the distance between the rack pair 124 and 126, whereby column width is dependent on the number of columns. In an exemplary embodiment of the present invention, where the number of columns are 3 and the distance between the rack pairs is 124 and 126 is 3 feet, the width X associated with the column is 1 feet. In particular, the width of cell 136 is 1 feet. Y is representative of the height of a row of the navigation grid 134. As explained above, the number of rows of the navigation grid are computed based on the number of shelves 132 in any rack column 128A or 128B, such that the combined height of rows is substantially equal to the height of any of the racks pair 124 and 126 forming the aisle 122. Thereby, height Y associated with the row is derived by dividing height of the rack 124 or 126 by number of shelves 132. In another embodiment of the present invention, the height Y associated with the rows of the navigation grid 134 is evaluated based on the shortest height inventory in the aisle. Further, Z is representative of the depth of the rows or the columns of the navigation grid 134, in particular z represents the depth of the navigation grid 134. As explained above, the number of navigation grids are evaluated based on number of any of the rack columns 128A or 128B along the length of rack pair 124 and 126, whereby Z is the width of rack column 128. In another embodiment of the present invention, where the number of navigation grids are evaluated based on the number of shortest width inventories that can be linearly placed in the adjacent shelves 132 along the length of racks 124 or 126, Z is computed based on the width of the shortest inventory in the shelf 132. In another embodiment of the present invention, the path associated with individual cells 136 of the navigation grid 134 for the lateral, longitudinal forward and backward movement of UAV can be enhanced based on the shortest dimensions of the inventory.

Each cell 136 (FIG. 4) of the navigation grid is associated with at least a portion of shelf 132 in one or both the linearly opposing rack columns 128A and 128B. The association of cells 136 with the shelves 132 is based on the longitudinal order of the shelves in the linearly opposing rack columns 128A and 128B. In an exemplary embodiment of the present invention, as shown in FIG. 3, the left top cell 136 of the grid 134 is associated with left top shelf 132. The right top cell 136 is associated with right top shelf 132 and the middle top cell is associated with both the top left and top right shelves 132. Further the middle left cell 136 is associated with middle left shelf 132. Similarly, all cells 136 are associated with a shelf based on the longitudinal order of the shelves in the linearly opposing rack columns 128A and 128B.

Each navigation grid 134 is processed and arranged to generate a 3D grid map corresponding to an aisle included in the mission. In an embodiment of the present invention, each navigation grid 134 is processed using the density mapping of the inventory and arranged in an order of rack columns to generate a 3D grid map covering at least a portion of length of the aisle. The individual cells 136 of each navigation grid 134 are marked based on the density mapping of inventory with corresponding shelves 132 in laterally opposing racks columns 128A and 128B. In an exemplary embodiment of the present invention, as shown in FIG. 3, the cells 136 corresponding to shelves 132 of rack column 128A and column 128B including the inventory are marked by characters L, B and R. The cells 136 corresponding to shelves 132 of the rack column 128A and column 128B not including the inventory are marked by character N. the characters L, B, R and N define the movement of the UAV 104 for scanning the shelves 132. The character L is representative of scanning the left shelf as per the navigation grid 134. The character B is representative of bidirectional shelf scanning as per the row of the navigation grid 134. The cells 136 of the navigation grid 134 are marked as bidirectional scan (B) cell if both the laterally adjacent cells (L and R) have inventory. In particular, the character B is used for the middle cells of the row of the navigation grid 134 where left cell is marked with L and right cell is marked with R. The character R is representative of right shelf scanning as per the row of the navigation grid 134. The character N refers to no scanning as per the row of the navigation grid 134.

A representation of the Density Based Navigation Grid (DBNG) associated with a portion of longitudinally arranged shelves 132 of linearly opposing second rack columns 128A and 128B is shown.

$$\begin{bmatrix} L, & B, & R \\ L, & N, & N \\ L, & B, & R \\ N, & N, & N \end{bmatrix}$$

The characters L, R, B and N are representative of the marking on each cell 136 of the navigation grid 134 shown in FIG. 3.

At step 206, a navigation path for the UAV is generated based on the generated 3D grid map. The navigation path includes directions to the shelves of the aisle having inventory. In an embodiment of the present invention, the 3D grid map associated with the aisle is processed into a unidirectional density nodes graph, where the individual cells 136 or a cluster of neighboring cells 136 of the 3D grid map are representative of nodes of the graph. Each cell 136 of the each of the navigation grid 134 marked with no scan are discarded. Further, center of each of the remaining cells of each navigation grid 134 are represented as a node of the graph. Furthermore, all the nodes of each navigation grid 134 in the 3D grid map are connected to the other neighboring nodes in the same navigation grid and the subsequent navigation grids with an undirected edge. Finally, the nodes associated with cells marked as bidirectional scan are additionally marked with cyclic edge pointing to itself which is later converted to yaw of the UAV 104 in path planning.

Further one or more path planning techniques are used to generate a navigation path covering at least a portion of length of the aisle included in the mission from the density nodes graph. In an exemplary embodiment of the present invention, the path planning technique is an A-star path planning technique. The A-star path planning technique generates an optimized path for the UAV for the requested mission based on the generated density nodes graph. The resulting path includes directions to shelves 132 of the aisles comprising inventory and omits areas having no or sparse inventory. Advantageously, the resultant path improves efficiency of the UAV and optimizes warehouse management. The generated navigation path associated with the aisle is stored for future use. The stored navigation map is used if no change is detected in inventory density of aisles (included in the mission) after image segmentation. In an embodiment of the present invention, the stored path is updated if a change is detected in inventory density of aisles (included in the mission) after image segmentation.

At step 208, the UAV is operated to follow the generated path trajectory. At step 210, position of UAV is continuously tracked and a check is performed to detect obstacles and new inventories in the generated path until the UAV completes the generated path trajectory. In an embodiment of the present invention, the identified landmark features of the aisle along with one or more LIDAR scanners of the UAV are used to detect dynamic obstacles. The placement of new inventory in the generated path is detected by using identified landmark features of the aisle, and performing image segmentation and analytics on images received during the traversing of the path trajectory. In an exemplary embodiment of the present invention, the placement of new inventory is detected in the forward direction. Further, one or more obstacle avoidance techniques are used to avoid the detected obstacles. At step 212, the generated path is updated to include the area or shelves of the aisle where the new inventory is placed by repeating steps 202-206.

Figure 6:
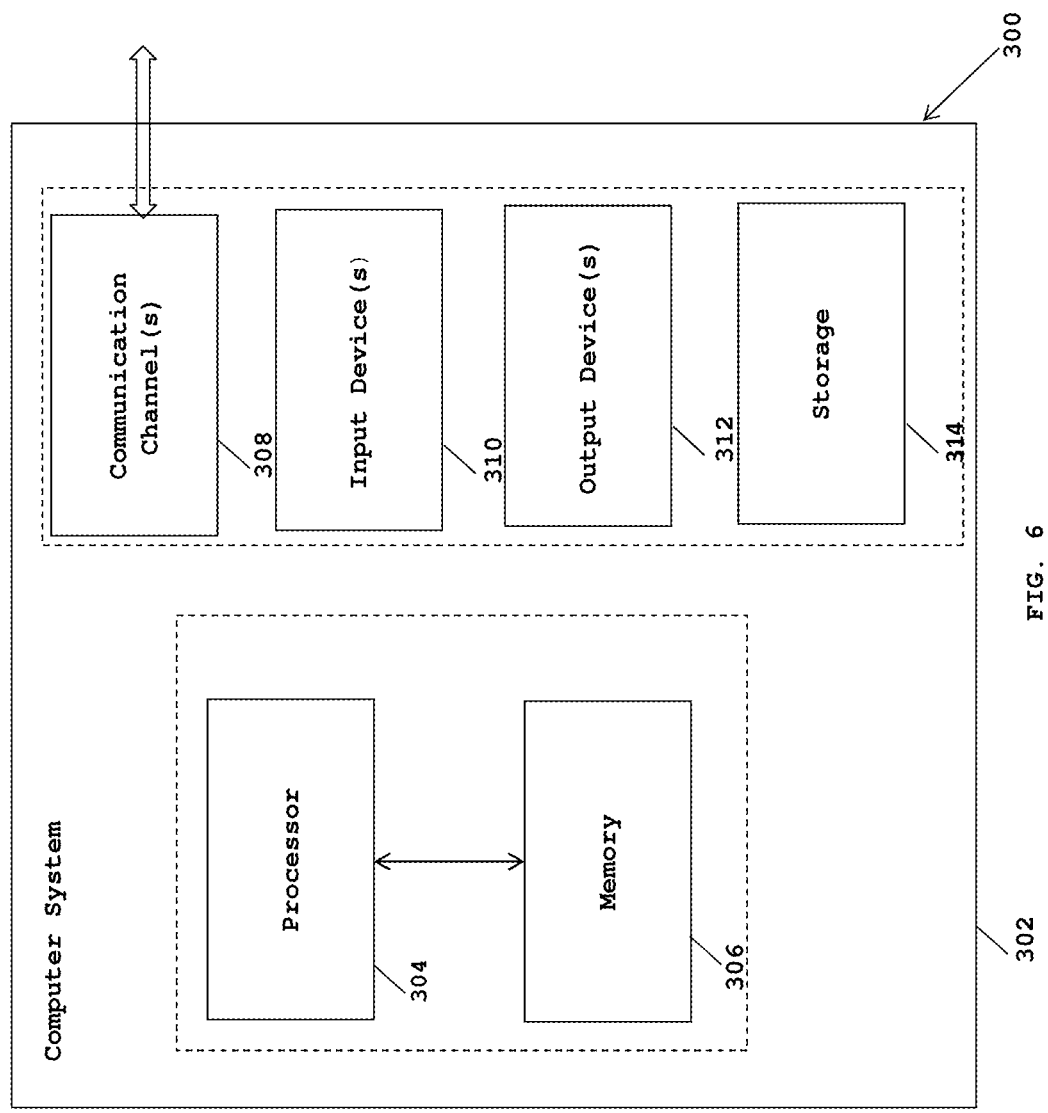
FIG. 6 illustrates an exemplary computer system in which various embodiments of the present invention may be implemented.

At step 214, steps 202-212 are repeated for respective aisles included in the mission to generate respective 3D grid maps FIG. 6 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for generating optimized path for an Unmanned Aerial Vehicle (UAV) for warehouse management, wherein the method is implemented by at least one processor in communication with a memory, the method comprising:

processing, by the processor, a plurality of images of aisles of a warehouse received via image capturing devices in the UAV to identify landmark features of the aisles of a warehouse and a density of inventory, wherein the landmark features comprises dimensions of the aisles, dimensions and number of racks forming the aisles, dimensions and number of shelves, and wherein the density of inventory is representative of number of items placed on the shelves in the aisles, wherein the plurality of images are processed by performing image segmentation such that pixels of respective images are semantically classified to identity the landmark features of the aisles and the segmented portions are analyzed to identify the density of the inventory; and operating, by the processor, the UAV via a control unit of the UAV through an optimized flight in the warehouse based on a navigation path generated for the UAV that includes density nodes representing direction to the shelves of the aisles having the inventory, thereby optimizing warehouse management, wherein the navigation path is generated based on a three dimensional (3D) grid map for the aisles using a pre-existing map of the warehouse, the identified landmark features and the identified density of inventory, wherein the 3D grid map includes one or more navigation grids representing the plurality of shelves, and the navigation grids are marked based on the identified density of inventory.

2. The method as claimed in claim 1, wherein the generated navigation path is updated to include one or more of the plurality of shelves in the aisle where the new inventory is detected.

3. The method as claimed in claim 1, wherein
the image segmentation is performed on the received plurality of images using one or more techniques selected from at least one of: deep learning techniques, edge detection based segmentation technique, multi-class image segmentation and object detection techniques.

4. The method as claimed in claim 3, wherein receiving the plurality of images of the aisles comprises operating the UAV to take off from an initial location to a desired location and position in the aisles for capturing the one or more images via the image capturing device along a length of the aisles on receiving a mission request, wherein the mission includes collection of data associated with inventory at either a single shelf, multiple shelves or all the shelves in one or both racks forming the aisles, further wherein the desired image capturing location of the UAV is selected based on the mission and placement of racks forming the aisles and the desired position is selected based on analysis of depth and height of the aisles.

5. The method as claimed in claim 1, wherein the landmark feature of the aisles comprises edges, corners of the aisles, length, height and width of rack pair forming the aisles, distance between opposing rack pair forming the aisles, height of each of the plurality of shelves, number of shelves, number of rack columns, pallets and any other storage unit on the racks.

6. The method as claimed in claim 1, wherein generating the 3D grid map for the aisles comprises:
generating the one or more navigation grids covering at least a portion of length of the aisles, wherein each navigation grid is in the form of n×m matrix comprising n rows and m columns, wherein each navigation grid is divided into n×m cells, wherein each cell is associated with at least a portion of corresponding shelf in one or both linearly opposing rack columns of a rack pair forming the aisles;
processing each of the one or more navigation grids using the density mapping of the inventory, wherein each individual cell of respective one or more navigation grids is marked based on the density mapping of inventory with corresponding shelves in laterally opposing racks columns; and
arranging the grids in an order of rack columns to generate the 3D grid map of the aisles.

7. The method as claimed in claim 6, wherein a number of navigation grids is evaluated based on a number of shortest width inventories that can be linearly placed in the adjacent shelves along the length of any of the racks forming the aisles.

8. The method as claimed in claim 6, wherein a number of navigation grids is evaluated based on number of rack columns along the length of rack pair forming the aisle.

9. The method as claimed in claim 6, wherein a number of rows of the navigation grid is computed based on a number of shortest height inventories that can be stacked vertically along the height of the racks forming the aisles, such that the combined height of rows is substantially equal to the height of the rack pair forming the aisles.

10. The method as claimed in claim 6, wherein, a number of columns of the navigation grid is computed based on a distance between the rack pair and the image capturing range of the image capturing devices associated with the UAV, such that the combined width of said columns is representative of a proportion the distance between the rack pair.

11. The method as claimed in claim 6, wherein each cell is a three dimensional (3D) cuboid having dimensions (X×Y×Z), wherein X is representative of column width of the navigation grid and is computed based on the distance between the opposing rack pair, Y is representative of height of a row of the navigation grid and is computed based on the height of the shortest height inventory in the aisle, such that the combined height of rows is substantially equal to the height of any of the rack of rack pair, further wherein Z is representative of the depth of the rows or the columns of the navigation grid and is evaluated based on either the width of rack column or width of the smallest inventory in the aisle.

12. The method as claimed in claim 6, wherein the cells of the navigation grid associated with shelves including the inventory are marked by characters L, B and R and the cells corresponding to shelves with no inventory are marked by character N, wherein the characters L, R represent unidirectional scanning towards left or right based on shelf orientation, further wherein character B represents bidirectional scan and character N represents no scanning.

13. The method as claimed in claim 1, wherein generating the navigation path including the density node representing the direction to the shelves having the inventory comprises:
processing the 3D grid map associated with the aisles into a unidirectional density node graph, wherein the individual cells of the each of the navigation grid associated with the 3D grid map marked with no scan are discarded, further wherein center of each of the remaining cells are represented as a node of the graph and all the nodes of respective navigation grids are connected to the other neighboring nodes with an undirected edge, wherein further the nodes associated with cells marked as bidirectional scan are additionally marked with cyclic edge pointing to itself which is later converted to yaw of the UAV in path planning; and
generating a navigation path for the aisles from the density nodes graph using one or more path planning techniques, wherein the resulting path omits shelves having no inventory and includes directions to shelves of the aisles comprising inventory.

14. A system for generating optimized path for an Unmanned Aerial Vehicle (UAV) for warehouse management, the system comprising:
a memory storing program instructions; a processor configured to execute program instructions stored in the memory to execute a path planning engine to:
process a plurality of images of aisles of a warehouse received via image capturing devices in the UAV to identify landmark features of the aisles of a warehouse and a density of inventory, wherein the landmark features comprises dimensions of the aisles, dimensions and number of racks forming the aisles, dimensions and number of shelves, and wherein density of inventory is representative of number of items placed on the shelves in the aisles, wherein the plurality of images are processed by performing image segmentation such that pixels of respective images are semantically classified to identity the landmark features of the aisles and the segmented portions are analyzed to identify the density of the inventory; and operate the UAV via a control unit of the UAV through an optimized flight in the warehouse based on a navigation path generated for the UAV that includes density nodes representing direction to the shelves of the aisle having the inventory, thereby optimizing warehouse management, wherein the navigation path is generated based on a three dimensional (3D) grid map for the aisles using a pre-existing map of the warehouse, the identified landmark features and the identified density of inventory, wherein the 3D grid map includes one or more navigation grids representing the plurality of shelves, and the navigation grids are marked based on the identified density of inventory.

15. The system as claimed in claim 14, wherein the path planning engine comprises an image analytics unit in communication with the processor, said image analytics unit interfaces with the image capturing devices and is configured to process the plurality of images to identify the landmark features of the aisle by:

performing the image segmentation on the plurality of images using one or more techniques selected from at least one of: deep learning techniques, edge detection based segmentation technique, multi-class image segmentation and object detection techniques.

16. The system as claimed in claim 15, wherein receiving the plurality of images of the aisles via the image capturing device comprises operating the UAV to take off from an initial location to a desired location and position in the aisles for capturing the one or more images along a length of the aisles on receiving a mission request, wherein the mission includes collection of data associated with inventory at either a single shelf, multiple shelves or all the shelves in one or both racks forming the aisles, further wherein the desired image capturing location of the UAV is selected based on the mission and placement of racks forming the aisles and the desired position is selected based on analysis of depth and height of the aisles.

17. The system as claimed in claim 14, wherein the landmark feature of the aisles comprises edges, corners of the aisles, length, height and width of rack pair forming the aisles, distance between opposing rack pair forming the aisles, height of each of the plurality of shelves, number of shelves, number of rack columns, pallets and any other storage unit on the racks.

18. The system as claimed in claim 14, wherein the path planning engine comprises a path generation unit in communication with the processor, said path generation unit configured to generate the 3D grid map for the aisles by:

generating the one or more navigation grids covering at least a portion of length of the aisles, wherein each navigation grid is in the form of n×m matrix comprising n rows and m columns, wherein each navigation grid is divided into n×m cells, wherein each cell is associated with at least a portion of corresponding shelf in one or both linearly opposing rack columns of a rack pair forming the aisles;

processing each of the one or more navigation grids using the density mapping of the inventory, wherein each individual cell of respective one or more navigation grids is marked based on the density mapping of inventory with corresponding shelves in laterally opposing racks columns; and arranging the grids in an order of rack columns to generate the 3D grid map of the aisles.

19. The system as claimed in claim 18, wherein a number of navigation grids is evaluated based on a number of inventories that can be linearly placed in the adjacent shelves along the length of any of the racks forming the aisles.

20. The system as claimed in claim 18, wherein a number of navigation grids is evaluated based on number of columns along the length of rack pair forming the aisles, if the racks are mirror of one another.

21. The system as claimed in claim 18, wherein a number of rows of the navigation grid is computed based on the number of shelves in the rack column, such that the combined height of rows is substantially equal to the height of the rack pair forming the aisles.

22. The system as claimed in claim 18, wherein a number of columns of the navigation grid is computed based on a distance between the rack pair and the image capturing range of the image capturing devices associated with the UAV, such that the combined width of said columns is representative of a proportion of the distance between the rack pair.

23. The system as claimed in claim 18, wherein each cell is a three dimensional (3D) cuboid having dimensions (X×Y×Z), wherein X is representative of column width of the navigation grid and is computed based on the distance between the opposing rack pair, Y is representative of height of a row of the navigation grid and is computed based on the number of shelves in any rack column, such that the combined height of rows is substantially equal to the height of any of the rack of rack pair, further wherein Z is representative of the depth of the rows or the columns of the navigation grid and is evaluated based on either the width of rack column or width of the smallest inventory in any of the shelves.

24. The system as claimed in claim 18, wherein the cells of the navigation grid associated with shelves including the inventory are marked by characters L, B and R and the cells corresponding to shelves with no inventory are marked by character N, wherein the characters L, R represent unidirectional scanning towards left or right based on shelf orientation, further wherein character B represents bidirectional scan and character N represents no scanning.

25. The system as claimed in claim 14, wherein the path planning engine comprises a path generation unit in communication with the processor, said path generation unit configured to generate the navigation path including the density node representing the direction to the shelves having the inventory by:

processing the 3D grid map associated with the aisles into a unidirectional density node graph, wherein the individual cells of the each of the navigation grid associated with the 3D grid map marked with no scan are discarded, further wherein center of each of the remaining cells are represented as a node of the graph and all the nodes of respective navigation grid are connected to the other neighboring nodes with an undirected edge, wherein further the nodes associated with cells marked as bidirectional scan are additionally marked with cyclic edge pointing to itself which is later converted to yaw of the UAV in path planning; and generating a navigation path for the aisles from the density nodes graph using one or more path planning techniques, wherein the resulting path omits shelves having no inventory and includes directions to shelves of the aisles comprising inventory.

26. The system as claimed in claim 14, wherein the path planning engine comprises a tracking and optimization unit in communication with the processor, said tracking and optimization unit interfaces with image capturing devices and is configured to:
   continuously track a position of the UAV and perform a check to detect obstacles and new inventories in the path trajectory associated with the navigation map until the UAV completes the generated path trajectory; and
   update the generated navigation path to include one or more of the plurality of shelves in the aisles where the new inventory is detected.

27. A computer program product comprising:
   a non-transitory computer-readable medium having computer-readable program code stored thereon, the computer-readable program code comprising instructions that, when executed by a processor, cause the processor to:
      process a plurality of images of aisles of a warehouse received via image capturing devices in the UAV to identify landmark features of the aisles of a warehouse and a density of inventory, wherein the landmark features comprises dimensions of the aisles, dimensions and number of racks forming the aisles, dimensions and number of shelves, and wherein density of inventory is representative of number of items on shelves in the aisles, wherein the plurality of images are processed by performing image segmentation such that pixels of respective images are semantically classified to identity the landmark features of the aisles and the segmented portions are analyzed to identify the density of the inventory; and
   operate the UAV via a control unit of the UAV through an optimized flight in the warehouse based on a navigation path generated for the UAV based on the generated 3D grid map, wherein the navigation path includes density nodes representing direction to the shelves of the aisles having the inventory, thereby optimizing warehouse management, wherein the navigation path is generated based on a three dimensional (3D) grid map for the aisles using a preexisting map of the warehouse, the identified landmark features and the identified density of inventory, wherein the 3D grid map includes one or more navigation grids representing the plurality of shelves, and the navigation grids are marked based on the identified density of inventory.

* * * * *